No. 623,402. Patented Apr. 18, 1899.
L. K. HONG.
WINDMILL.
(Application filed Apr. 27, 1898.)
(No Model.) 2 Sheets—Sheet 1.
FIG. 1.
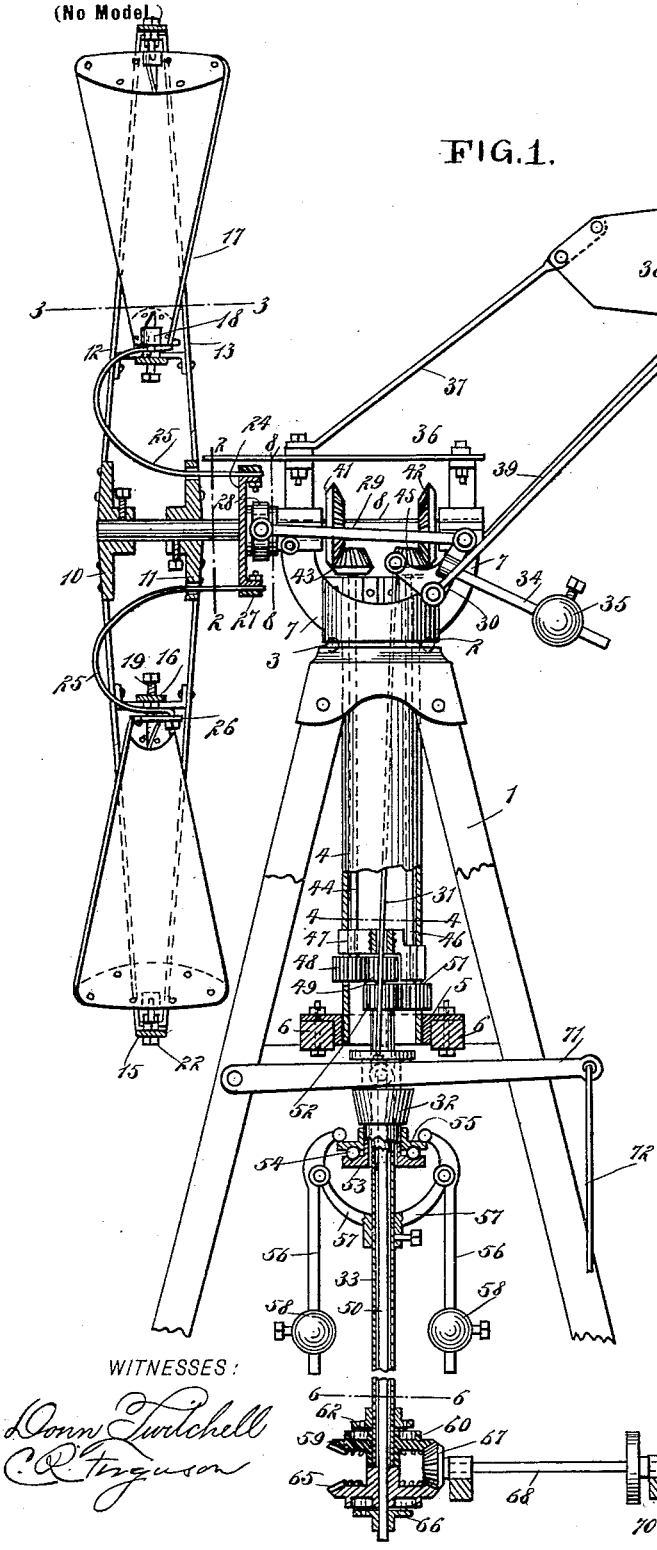
FIG. 4.
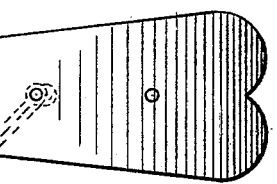
FIG. 5.
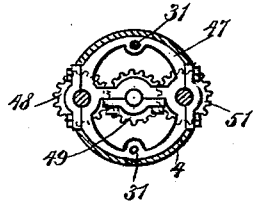
FIG. 6.
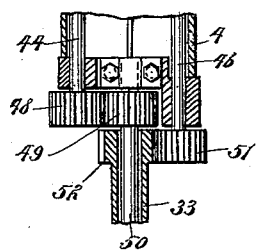
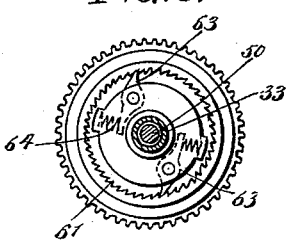
WITNESSES:
Donn Twitchell
C. R. Ferguson
INVENTOR
L. K. Hong.
BY
ATTORNEYS.

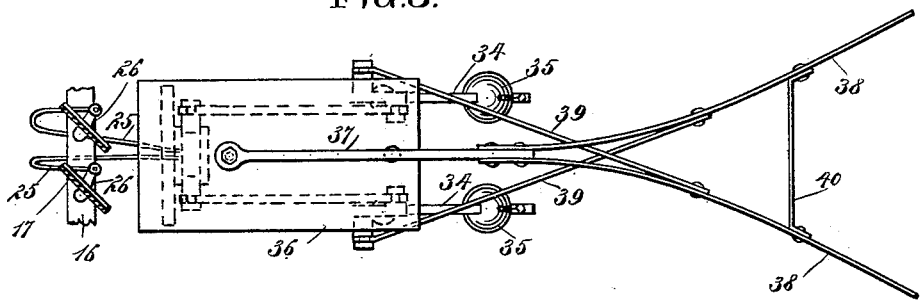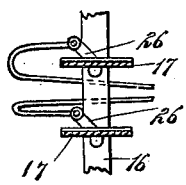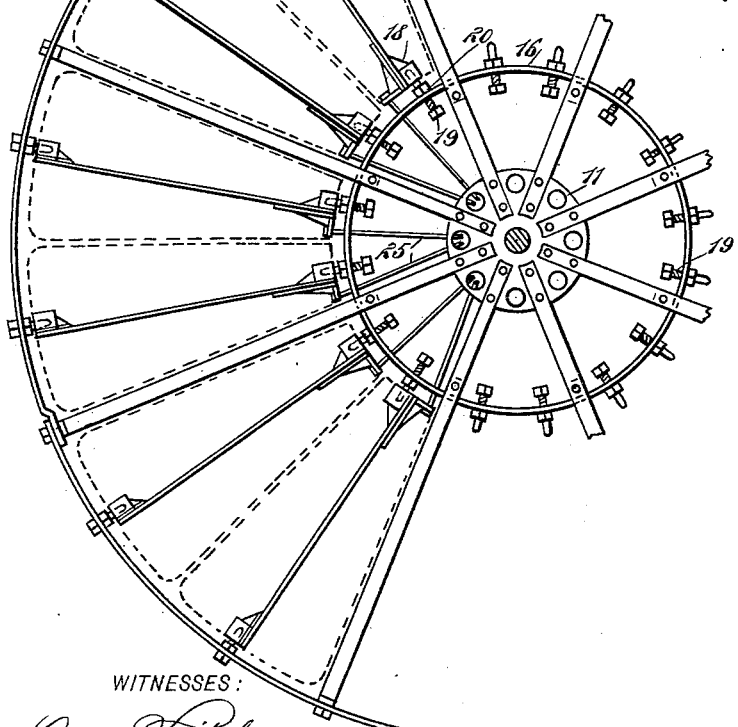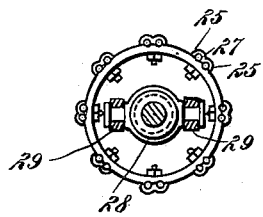

UNITED STATES PATENT OFFICE.

LOUIS K. HONG, OF PARKLAND, WASHINGTON.

WINDMILL.

SPECIFICATION forming part of Letters Patent No. 623,402, dated April 18, 1899.

Application filed April 27, 1898. Serial No. 678,978. (No model.)

*To all whom it may concern:*

Be it known that I, LOUIS K. HONG, of Parkland, in the county of Pierce and State of Washington, have invented new and useful Improvements in Windmills, of which the following is a full, clear, and exact description.

This invention relates to improvements in windmills; and the object is to provide a windmill constructed of iron and steel, thus being comparatively light, yet strong and rigid, and, further, to provide a governor to cause the wheel to maintain a substantially even speed of rotation under wind-currents of varying velocities, and, further, to provide a certain combination of double gears and shafts for the transmitting of rotary motion from the wind-wheel shaft to the line or driving shaft and also to prevent side draft or climbing out of right angles to the wind, which is as detrimental as it is common in ordinary geared windmills when employed in heavy work, and, further, to provide a wind-wheel balanced and held squarely to the wind by a rudder-vane so constructed and so attached to the turn-table as to prevent all the objectionable swaying to and fro when standing still or when at work.

I will describe a windmill embodying my invention and then point out the novel features in the appended claims.

Reference is to be had to the accompanying drawings, forming a part of this specification, in which similar characters of reference indicate corresponding parts in all the views.

Figure 1 is a partial side elevation and partial section of a wind-wheel and gearing embodying my invention. Fig. 2 is a partial elevation of the wheel and partial section on the line 2 2 of Fig. 1. Fig. 3 is a partial plan view and partial section on the line 3 3 of Fig. 1. Fig. 4 is a section on the line 4 4 of Fig. 1. Fig. 5 is a sectional detail showing some of the gearing employed. Fig. 6 is a section on the line 6 6 of Fig. 1. Fig. 7 is a detail view showing connections with wheel-blades for adjusting the same, and Fig. 8 is a section on the line 8 8 of Fig. 1.

Referring to the drawings, 1 designates the tower of the windmill and in which is mounted to rotate a tubular turn-table 2. Ball-bearings 3 are arranged between the under side of the turn-table 2 and the top of the tower 1, as plainly indicated in Fig. 1. The tubular portion 4 of the turn-table extends downward into the tower and has a bearing at its lower end in a ring 5, supported in cross-beams 6, arranged in the tower. Arms 7 extend upward from the turn-table, and the wind-wheel shaft 8 has bearings in these arms.

The wind-wheel comprises hubs or disks 10 11, secured to the shaft 8, and from these hubs spokes 12 13 extend outward. Opposite spokes converge toward their outer ends, and each opposite spoke has inwardly-turned ends, the end of one spoke overlapping the end of the other spoke, and these overlapped ends are connected by bolts 14 with a rim or band 15. A band 16 is connected to the spokes 12 and 13 between their ends, and extended between the band 15 and the band 16 are the wheel-blades 17. I have shown two wheel-blades 17 between each two pair of spokes; but it is obvious that a greater or less number may be employed without departing from the spirit of my invention.

Affixed to the inner end of each blade 17 is a casting 18, provided with an opening in which a bolt 19 engages and forms a bearing for the said inner end of the blade. The bolt 19 passes through a tapped hole in the band 16 and is preferably provided with a set-nut 20. The outer end of the blade has affixed to it a casting 21, having an opening in which a bolt 22 engages, the said bolt 22 being passed through the outer band 15 and provided with a set-nut 23. These bolts 19 and 22 form the pivots upon which the blade turns, and, as shown, the castings 18 and 21 are arranged in the inner side of the blade. The inner bolts 19 are somewhat longer than the outer ones and may be moved as desired to adjust the bearings.

Movable longitudinally on the shaft 8, but adapted to rotate therewith, is a blade-adjusting disk 24. From the disk 24 adjusting-rods 25 extend outward through openings in the hub or disk 11 and thence are turned rearward and connected to crank-arms 26, extended outward from the blades at the side opposite the castings 18. The adjusting-rods are connected to the disk 24 in pairs by means of clips 27, which are bolted to the rear flange of said disk. It will be seen that two adjusting-rods extend through each hole formed in the hub 11 and that a clip 27 serves to hold such two rods.

Engaged in an annular channel formed in the hub portion of the disk 24 is a ring 28, having outwardly-extended arms, from which links 29 extend to connections with the vertically-disposed members of angle-levers 30, mounted to rock on studs extended outward from the turn-table. From the horizontally-disposed members of these angle-levers 30 rods 31 extend downward through the tubular portion 4 of the turn-table and connect with a sleeve 32, mounted to move vertically on a tubular shaft 33. Extended outward from the vertically-disposed portions of the levers 30 are arms 34, on which weights 35 are adjustably mounted.

Arranged over the turn-table and over the shaft 8 and its gearing is a plate 36, and extended upward from this plate 36 and at an acute angle thereto is a vane-holding rod 37, to the upper end of which are connected the inner ends of two diverging rudders 38, and from these rudders rods 39 extend downward to connection with the studs on which the angle-levers 30 are mounted to rock. These rods 39, it will be noticed in Fig. 3, are crossed, so that the rod connected to one stud will engage with the rudder-blade at the opposite side of the rod 37. The rudder-blades 38 may be rigidly connected together by a cross-brace 40. By employing two diverging rudder-blades the wheel will be much more easily and fixedly held to the wind than would be the case were a single rudder-blade employed and extended parallel with the wind-wheel shaft.

Mounted on the shaft 8 between the arms 7 are bevel-gears 41 42. The bevel-gear 41 meshes with a pinion 43, which has a shaft 44 extended downward through the turn-table and its tubular portion 4, and the bevel-gear 42 meshes with a pinion 45, and from this pinion 45 a shaft 46 extends downward through the turn-table and its tubular portion 4. These shafts 44 and 46 have bearings in a block 47, arranged in the tubular portion of the turn-table, and on the lower end of the shaft 44 is a pinion 48, meshing with a pinion 49 on a shaft 50, which extends through the tubular shaft 33, and on the shaft 46 is a pinion 51, meshing with a pinion 52 on the tubular shaft 33. By this arrangement of gearing it is obvious that the shafts 33 and 50 will be rotated in opposite directions, and therefore may be employed for rotating two parts of machinery designed to operate in opposite directions—such, for instance, as millstones or burs.

On the lower end of the sleeve 32 is an annular flange 53, having a raceway in its upper side for bearing-balls 54, and upon these bearing-balls engages a disk or ring 55, which is loose on the sleeve. Governor-arms 56 are pivoted to arms 57, extended outward from the hollow shaft 33, and the upper ends of these governor-arms engage against the upper surface of the ring 55, and on these arms weights 58 are adjustably mounted. Loosely mounted on the tubular shaft 33 is a bevel-gear 59, having on its upper side a ring 60, on the inner surface of which are formed ratchet-teeth 61, and rigidly attached to the tubular shaft 33, above the wheel 59, is a collar 62, to which dogs 63 are pivoted one opposite the other. These dogs 63 engage with the ratchet-teeth 61 and are held yieldingly in engagement therewith by springs 64, engaging at one end against lugs on the collar 62 and on the other end against the inner ends of the dogs.

Loosely mounted on the shaft 50 is a bevel-gear 65, and also affixed to said shaft 50 is a collar 66, having dogs similar to the dogs 63 and engaging with ratchet-teeth formed on the gear 65 similar to the ratchet-teeth on the gear 59. These bevel-gears 59 and 60 engage, respectively, with the upper and lower sides of a bevel-pinion 67, secured to a counter-shaft 68, having a crank 69, with which an actuating-rod 70 engages.

In operation and as the speed of the wheel increases under the influence of a high wind the governor-arms 56 will be thrown outward by centrifugal action, and this outward movement of the arms will move the sleeve 32 downward, and this movement of the sleeve by drawing upon the rods 31 will rock the angle-levers 30, which will move the disk 24 toward the wind-wheel. This movement of the disk 24 and through the agency of the rods 25 will shift the blades 17 with their front edges more or less to the wind. As the velocity decreases the governor-arms of course will swing downward and the weights 35 will rock the angle-levers 30, which will draw the sleeve 32 upward and also draw the disk 24 away from the wheel and cause the width of the blades to be turned to the wind.

When it is desired to adjust the wheel out of gear, so that it will not rotate, the blades are to be moved with their edges to the wind by means of a lever 71, pivoted at one end to one of the uprights of the tower and engaging in an annular angle formed in the sleeve 32, and from the outer or free end of this lever 71 a rod 72 is extended downward to the base of the tower. By drawing downward on this rod 72 the sleeve 32 will be drawn downward, and consequently the blade shifted, as before described, for by fastening the lower end of the rod 72 the said blades will be secured in their inoperative position. By the dog-and-ratchet arrangement of the gears 59 and 65 it is obvious that the turn-table may move freely under the wind-pressure in a direction opposite to that of the rotation of the wheels 59 and 65.

Having thus described my invention, I claim as new and desire to secure by Letters Patent—

1. A wind-wheel, comprising a hub, front and rear spokes extended from the hub, a band secured to the outer ends of the spokes, an inner band supported by the spokes, blades arranged in the wheel, bolts passing through the inner band and into socket-castings on the blades, bolts passing through the outer band into socket-castings on the blades, crank-arms extended from the inner ends of the blades, rods extended from said crank-arms through openings in the hub, and a governor with which the rods connect substantially as specified.

2. A wind-wheel, comprising a shaft, inner and outer hub-disks secured to said shaft, spokes extended from said hub-disks, opposite spokes converging toward their outer ends and having the outer ends overlapped, an outer band, bolts passing through said band and through the overlapped ends of the spokes, an inner band supported by the spokes, blades arranged in the wheel, bolts passing through the outer band into socket-castings on the blades, bolts passing through the inner band and into socket-castings on the blades, crank-arms extended from the inner ends of the blades, rods extending from said crank-arms through openings in the inner hub-disk, and governor mechanism with which said rods connect, substantially as specified.

3. In a windmill, a wheel, a turn-table, a shaft for the wheel having bearings in arms extended upward from the turn-table, bevel-gears on said shaft, rods extended downward through the turn-table and having bevel-pinions engaging with said bevel-gears, a tubular shaft driven by one of said rods, a shaft within the tubular shaft and driven by the other of said rods, substantially as specified.

4. In a windmill, a tower, a turn-table mounted on said tower and having a tubular portion extended downward into the tower, a shaft having bearings in arms extended from the turn-table, a wheel mounted on said shaft, bevel gear-wheels on the shaft of the wind-wheel, bevel-pinions engaging therewith, shafts extended from said pinions through the tubular extensions of the turn-table, a tubular shaft driven by one of the shafts extended from a pinion, a shaft within the tubular shaft and driven from the shaft of said other pinion, a bevel-gear on the lower end of the tubular shaft, and a bevel-gear on the lower end of the shaft within the tubular shaft, substantially as described.

5. In a windmill, the combination with a turn-table, of two diverging rudder-blades supported on the turn-table, and crossed rods extended downward from the blades to the turn-table, substantially as described.

LOUIS K. HONG.

Witnesses:
J. L. ERICKSON,
W. N. WATSON.